US009336397B2

(12) United States Patent
Allen et al.

(10) Patent No.: US 9,336,397 B2
(45) Date of Patent: May 10, 2016

(54) COMBINING TYPE-ANALYSIS WITH POINTS-TO ANALYSIS FOR ANALYZING LIBRARY SOURCE-CODE

(71) Applicant: Oracle International Corporation, Redwood Shores, CA (US)

(72) Inventors: Nicholas John Allen, Brisbane (AU); Padmanabhan Krishnan, Varsity Lakes (AU); Bernhard Friedrich Scholz, Sydney (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/319,698

(22) Filed: Jun. 30, 2014

(65) Prior Publication Data

US 2015/0379271 A1    Dec. 31, 2015

(51) Int. Cl.
*G06F 21/57*    (2013.01)

(52) U.S. Cl.
CPC ........ *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| 2004/0260940 A1* | 12/2004 | Berg et al. ..................... 713/200 |
| 2008/0016496 A1* | 1/2008 | Li et al. .......................... 717/124 |
| 2008/0072214 A1* | 3/2008 | Peyton et al. .................. 717/133 |
| 2013/0091487 A1* | 4/2013 | Chandra et al. ............... 717/106 |
| 2013/0227693 A1* | 8/2013 | Dewey ............................ 726/25 |
| 2014/0020046 A1* | 1/2014 | Heitzman ........................ 726/1 |

OTHER PUBLICATIONS

Serge Abiteboul, Richard Hull, Victor Vianu, "Foundation of Databases", Addison Wesley Publishing Company, Inc., 1995. (702 pages).
Karim Ali and Ondrej Lhotak, "Averroes: Whole-Program Analysis without the Whole Program", In European Conference on Object-Oriented Programming (ECOOP), vol. 7920 of Lecture Notes in Computer Science, Springer, 2013. (24 pages).
Martin Bravenboer and Yannis Smaragdakis, "Strictly Declarative Specification of Sophisticated Points-to Analyses", In Proceeding of the 24th ACM SIGPLAN conference on Object Oriented Programming Systems languages and applications, OOPSLA '09, ACM, 2009. (19 pages).
Patrick Cousot and Radhia Cousot, "Modular Static Program Analysis", In Compiler Construction, No. 2304 in Lecture Notes in Computer Science, Springer 2002. (20 pages).

(Continued)

*Primary Examiner* — Robert Leung
(74) *Attorney, Agent, or Firm* — Osha • Liang LLP

(57) ABSTRACT

In general, in one aspect, the invention relates to a method for statically analyzing a library that includes obtaining native method annotations associated with native methods invoked by the library and extracting facts corresponding to the library from the library to obtain library facts. The library is written in a first programming language. The method also includes constructing a type-object lattice, modeling an abstracted heap using the type-object lattice, expressing abstracted heap update operations as heap update rules, and constructing, based on the library, a most general application (MGA) for the library. The method additionally includes analyzing the library using the native method annotations, the library facts, the MGA, the abstracted heap, and the heap update rules to obtain results, storing the results of the analysis, and performing an action based on the results.

18 Claims, 5 Drawing Sheets

(56) References Cited

OTHER PUBLICATIONS

Patrick Cousot and Radhia Cousot, "Abstract Interpretation: A Unified Lattice Model for Static Analysis of Programs by Construction or Approximation of Fixpoints", In Proceedings of the 4th symposiums on Principles of Programming Languages, ACM Press, 1977. (15 pages).

Jong-Deok Choi et al., "Escape Analysis for Java", In Proceedings of the 14th ACM SIGPLAN Conference on Object-Oriented Programming, Systems, Lanuages, and Applications, OOPSLA '99, ACM, 1999. (19 pages).

Barthelemy Dagenais and Laurie Hendren, "Enabling Static Analysis for Partial Jave Programs", In Proceedings of the 23rd ACM SIGPLAN Conference on Object-Oriented Programming, Systems, Languages, and Applications, OOPSLA '08, ACM, 2008. (16 pages).

Todd J. Green, Molham Aref, and Grigoris Karvounarakis, "LogicBlox, Platform and Language: a Tutorial", In Datalog in Academia and industry, vol. 7494 of Lecture Notes in Computer Science, Springer, 2012.(8 pages).

Rezwana Karim et al., "An Analysis of the Mozilla Jetpack Extension Framework", In European Conference on Object Oriented Programming (ECOOP), No. 7313 in Lecture Notes in Computer Science, Springer, 2012. (23 pages).

Byeongcheol Lee et al., "Jinn: Synthesizing Dynamic Bug Detectors for Foreign Language Interfaces", In Proceedings of the 2010 ACM SIGPLAN conference on Programming Language Design and Implementation, 2010 (14 pages).

Jan Midtgaard et al., "A Structural Soundness Proof for Shiver's Escape Technique: A Case for Galois Connections", In Static Analysis Symposium (SAS), No. 7460 in Lecture Notes in Computer Science, Springer, 2012 (18 pages).

Magnus Madsen, Benjamin Livshits, and Michael Fanning, "Practical Static Analysis of JavaScript Applications in the Presence of Frameworks and Libraries", In Joint Meeting of the European Software Engineering Conference and the ACM SIGSOFT Symposium on the Foundations of Software Engineering, (ESEC/FSE), ACM, 2013. (17 pages).

Ana Milanova, Atanas Rountev, and Barbara G. Ryder, "Parameterized Object Sensitivity for Points-to and Side-Effect Analyses for Java", In Proceedings of the 2002 ACM SIGSOFT International Symposium on Software Testing and Analysis, ACM, 2002. (11 pages).

Ana Milanova, Atanas Rountev, and Barbara G. Ryder, "Parameterized Object Sensitivity for Point-to Analysis for Java", ACM Transaction on Software Engineering Methodolology, Jan. 2005. (41 pages).

Barbara G. Ryder, "Dimensions of Precision in Reference Analysis of Object-oriented Programming Languages", In Proceedings of the 12th international Conference on Compiler Construction, Springer-Verlag, 2003. (12 pages).

Diomidis Spinellis and Panagiotis Louridas, "A Framework for the Static Verification of API Calls", Journal of Systems and Software, 2007. (26 pages).

Rui Wang et al., "Explicating SDKs: Uncovering Assumptions Underlying Secure Authentication and Authorization", In Proceedings of the 22nd USENIX Conference on Security, Sec'13, USENIX Association, 2013. (16 pages).

Haiyan Zhu, Thomas Dillig, and Isil Dillig, "Automated Inference of Library Specifications for Source-Sink Property Verification", In C.-C. Shan, editor, APLAS'13, vol. 8301 of Lecture Notes in Computer Science, Springer, 2013. (20 pages).

Flemming Nelson, Hanne Riis Nelson, and Chris Hankin, "Principles of Program Analysis", Springer, 2nd edition, 1999. (10 pages).

* cited by examiner

US 9,336,397 B2

COMBINING TYPE-ANALYSIS WITH POINTS-TO ANALYSIS FOR ANALYZING LIBRARY SOURCE-CODE

BACKGROUND

Computer applications (i.e., programs) often use libraries to perform at least some portion of the application's functionality. Different applications may use libraries in different ways and may cause the behavior of the library to change depending on when and how the library is invoked and used. Vulnerabilities may exist in the libraries, or in native methods included therein, that manifest when an application uses the library in various ways. Traditionally, static analysis of an application and the one or more libraries that the application uses require at least some portion of the source code of the application. Such static analysis may detect vulnerabilities that may manifest when the particular application being analyzed, or portion thereof, uses a library.

SUMMARY

In general, in one aspect, the invention relates to a method for statically analyzing a library that includes obtaining native method annotations associated with native methods invoked by the library and extracting facts corresponding to the library from the library to obtain library facts. The library is written in a first programming language. The method also includes constructing a type-object lattice, modeling an abstracted heap using the type-object lattice, expressing abstracted heap update operations as heap update rules, and constructing, based on the library, a most general application (MGA) for the library. The method additionally includes analyzing the library using the native method annotations, the library facts, the MGA, the abstracted heap, and the heap update rules to obtain results, storing the results of the analysis, and performing an action based on the results.

In general, in one aspect, the invention relates to a system for statically analyzing a library that includes a native methods annotation repository configured to store native methods annotations, a library repository configured to store a library, an extractor module configured to extract library facts from a library, and a library facts repository configured to store the library facts. The system also includes a library analysis module configured to express information related to the library as facts and rules in a declarative logic programming language that includes a type-object lattice, an abstracted heap comprising heap update rules, and a most general application (MGA). The system additionally includes an analysis execution engine configured to analyze the library based on the native method annotations, the library facts, the MGA, the abstracted heap, and the heap update rules to obtain results. And the system further includes an analysis results repository configured to store the results.

In general, in one aspect, the invention relates to a non-transitory computer readable medium includes instructions which, when executed by a computer, cause a computer processor to obtain native method annotations associated with native methods invoked by the library, extract facts corresponding to the library from the library to obtain library facts, wherein the library is written in a first programming language, construct a type-object lattice, model an abstracted heap using the type-object lattice, express abstracted heap update operations as heap update rules and construct, based on the library, a most general application (MGA) for the library. The non-transitory computer readable medium also includes instructions to analyze the library using the native method annotations, the library facts, the MGA, the abstracted heap, and the heap update rules to obtain results. The non-transitory computer readable medium includes additional instructions to store the results of the analysis, and perform an action based on the results.

Other aspects of the invention will be apparent from the following description and the appended claims.

DETAILED DESCRIPTION

Figure 1:
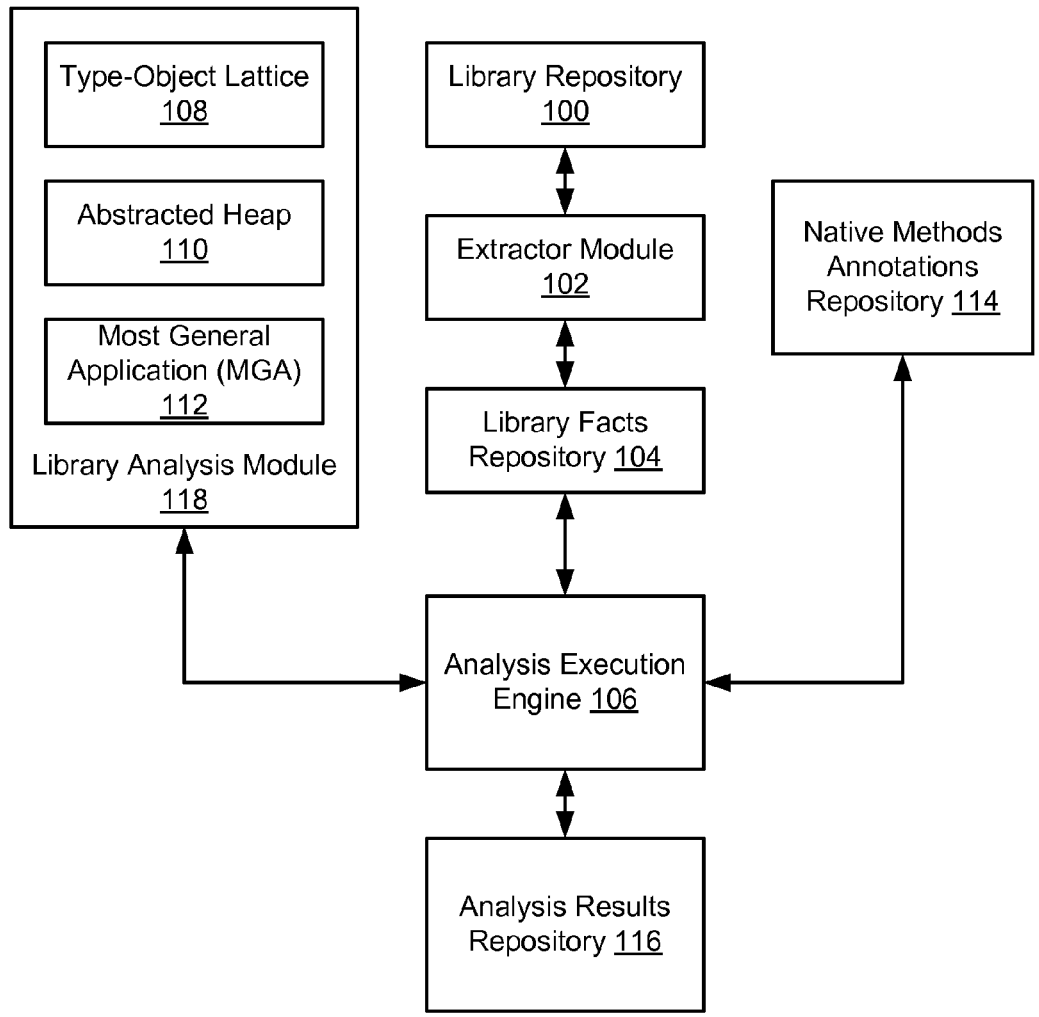
FIG. 1 shows a system in accordance with one or more embodiments of the invention.

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the inventions relate to a method and system for statically analyzing libraries that are to be used by computer applications (i.e., programs) without the presence of application source code. Specifically, in one or more embodiments of the invention, type analysis is combined with points-to analysis in order to analyze library source code. More specifically, a most general application (MGA) is constructed that semantically condenses the behavior, in relation to the library being analyzed, of all possible applications (or a portion thereof) into a single application. In one or more embodiments of the invention, the MGA is used, along with facts ascertained from the library, annotations of native methods invoked by the library, and other analysis related to the library, to analyze the library in order to determine if the library has security vulnerabilities.

FIG. 1 shows a system in accordance with one or more embodiments of the invention. As shown in FIG. 1, the system includes a library repository (100), an extractor module (102), a library facts repository (104), a native methods annotations repository (114), a library analysis module (118), an analysis execution engine (106), and an analysis results repository (116). In one or more embodiments of the invention, the library analysis module (118) includes a type-object lattice (108), an abstracted heap (110), and a most general application (MGA) (112). Each of these components are described below.

In one or more embodiments of the invention, the library repository (100) is a repository in which one or more libraries are stored. A library is a collection of implementations of programmatic behavior written in a programming language that may be used by any number of different entities (i.e., applications/programs) to invoke the behaviors included in the library. A library written in one programming language may include functionality to use native methods written in a different programming language to implement one or more of the behaviors of the library. In one or more embodiments of the invention, libraries provide a public interface to applications, and thus the behavior exhibited by the library is controlled, at least in part, by the application using the library. In one or more embodiments of the invention, the library repository (100) is a data repository that includes functionality to store one or more libraries. The data repository may be any type of storage unit and/or device (e.g., a file system, database, collection of tables, memory, or any other storage mechanism) for storing data. Further, the data repository may include multiple different storage units and/or devices. The multiple different storage units and/or devices may or may not be of the same type, located on the same physical or virtual machine, or located at the same physical site.

In one or more embodiments of the invention, an extractor module (102) is operatively connected to the library repository (100). In one or more embodiments of the invention, the extractor module is a mechanism for producing a set of semantic relations known as 'facts' (i.e., library facts) that are obtained by a single syntactic traversal over a library's source code. The relations that describe libraries may include, but are not limited to, classes and sub-class relations, the fields of a class, which method may invoke another method, the types of the parameters of each method, the variables declared in a method, the assignments in a method, etc. A non-limiting example of a relation (i.e., library fact) is AssignLocal:

AssignLocal("x","y","m1").
AssignLocal("y","z","m1").

The example shown directly above captures two local assignments x:=y and y:=z in method "m1" of a hypothetical library. Library facts may also, or alternately, be expressed in a spreadsheet format with comma separated value fields. Library facts may be used as input that an analysis execution engine combines with other facts (described below) and rules to obtain a desired outcome (e.g., a security analysis of the library). In one or more embodiments of the invention, the extractor module (102) is a computer program or sub-program written in any programming language now known or later developed, in order to implement instructions for performing at least a portion of the invention.

In one or more embodiments of the invention, a library facts repository (104) is operatively connected to the extractor module (102). In one or more embodiments of the invention, the library facts repository is a data repository, substantially similar to the data repository described above, that includes functionality to store library facts produced by the extractor module.

In one or more embodiments of the invention, the system includes a native methods annotations repository (114). In some programming languages, certain functionality and/or behavior may not be capable of being performed and/or invoked, or of being performed and/or invoked in a safe and/or efficient manner. In such situations, various programming languages provide an interface by which an application and/or library in the first programming language can invoke behavior implemented in a second programming language. For example, the Java® (Java is a registered trademark of Oracle America, Inc.) programming language provides a Java® Native Interface (JNI) through which system calls, libraries, etc. written in another programming language such as C++ may be invoked. Native methods annotations may be a pre-defined set of annotations of native methods that, at least in part, provide information related to the native methods that is useful in statically analyzing the native methods as called by a library. The annotations may be stored in the native methods annotations repository (114), which may be a data repository similar to the data repository described above. In one or more embodiments of the invention, the native methods annotations are expressed as facts for use as input to an analysis execution engine (e.g., analysis execution engine 106) and may be combined with other facts and rules to obtain a desired outcome (e.g., a security analysis of the library).

In one or more embodiments of the invention, the system includes a library analysis module (118). In one or more embodiments of the invention, the library analysis module is a computer program, and/or portions thereof, expressed in any programming language now known or later developed, in order to implement instructions for performing at least a portion of the invention. For example, the library analysis module may include elements (e.g., MGA (112), abstract heap (110)) expressed in a declarative logic programming language such as Datalog. Declarative programming (e.g., as opposed to imperative programming) is programming in which the logic of a computation is expressed without describing it's control flow. A declarative programming language may seek to minimize side effects by describing what a program should accomplish rather than how to accomplish the program goal. One type of declarative programming language are logic programming languages (e.g., Datalog) in which facts (e.g., library facts, native methods annotations expressed as facts, etc.) and rules (e.g., rules expressing the abstract heap, heap update operations, MGA, etc.) about a problem domain are expressed in logical forms. The library analysis module may include assumptions made regarding applications which may potentially interact with the library to be analyzed.

In one or more embodiments of the invention, the library analysis module (118) includes a type-object lattice (108). In one or more embodiments of the invention, the type-object lattice is a construct that describes the interaction between potential application code and the library code to be analyzed. The type-object lattice (108) may include nodes of types to represent the unknown application that may be interacting with the library as well as object-creation sites for objects within the library. A type may define what manner of values an object may have, what methods may operate on the object, and how the object may be stored. An object-creation site is a location in source code where an object may be created. An object-creation site may be considered a known object-creation site if the object is created within the library as a result if inter-library execution. An object-creation site may be considered an unknown object-creation site if the creation of the object at the site involves an application utilizing the library. In one or more embodiments of the invention, the type-object lattice (108) also includes classes (i.e., types) that subsume the known and unknown object-creation sites as well as sub-classes. A class, in an object-oriented programming language such as Java®, is a set of rules and methods that acts as a blueprint from which objects may be created and may set a type of the object. In one or more embodiments of the invention, the type-object lattice (108) is a partially ordered set. A partially ordered set is a set in which not all elements need be related to one another, but in which all elements are related to at least some other element(s) in the set.

In one or more embodiments of the invention, the library analysis module includes an abstracted heap (110) of the library to be analyzed. An abstracted heap is a model that includes: (i) nodes, which are the nodes of the type-object lattice; (ii) edges, which represent stored information in fields; and (iii) connections between the object/type that contains the field and the object type that is stored in the field. The abstracted heap (110) may be expressed as facts and rules in a declarative logic programming language (e.g., Datalog). For example, if the library has a statement of the form "o: x=new T( );", then the facts HeapAllocation ("o", "x"), HeapAllocation:Type ("o", "T") and Var:Type ("x", "T") are added to the abstracted heap. The facts may then combined with the following rule:

VarPointsTo(?heap, ?var)←
        HeapAllocation(?heap, ?var),
        HeapAllocation:Type(?heap,?t),
        Var:Type(?var, ?t).

Thus the initial state of the abstracted heap is described by the facts and the update of the abstracted heap is defined by the rules.

In one or more embodiments of the invention, the abstracted heap (110) includes functionality to be updated via a set of primitive operations including, but not limited to, operations related to an object creation site, an assignment, a store operation in a field, and a load operation from a field. In one or more embodiments of the invention, the abstracted heap (110) accommodates both known and unknown object-creation sites combined with compatible types related to the known and unknown object-creation sites, which allows the abstracted heap to account for all possible methods that may be dispatched related to the known and unknown object-creation sites. In one or more embodiments of the invention, the combination of types and object-creation sites allows for an over-approximation for the analysis. An over-approximation, in the context of a static analysis of a library, is one that may lead to false positives, but does not lead to false negatives. In one or more embodiments of the invention, heap update operations are expressed as rules in a declarative logic programming language (e.g., Datalog).

In one or more embodiments of the invention, the library analysis module additionally includes a MGA. In one or more embodiments of the invention, the MGA is a representation of the semantic behaviors of all possible applications, or a portion thereof, that may interact with a library that is to be analyzed, condensed into a single application. In one or more embodiments of the invention, the MGA is expressed, at least in part, via the possible types of the library that is to be analyzed at the points within the library where an application may interact with the library. The MGA may be an external abstracted heap that represents an initial state of the MGA that represents all applications, or a portion thereof, and may be used for analyzing a library. In one or more embodiments of the invention, the MGA is constructed with the assumption that the library to be analyzed includes the root class of the type-object lattice. A root class is a class that has no parent classes as super-classes and of whom all child classes are sub-classes. The MGA, similar to the abstracted heap of the library, may be expressed as facts and rules in a declarative logic programming language (e.g., Datalog).

In one or more embodiments of the invention, each of the library facts repository (104), the native methods annotations repository (114), and the library analysis module (118) are operatively connected to the analysis execution engine (106). In one or more embodiments of the invention, the analysis execution engine is a declarative logic programming language execution environment in which the expression of the library analysis module (e.g., Datalog language expression of the abstracted heap and MGA) is combined with library facts from the library facts repository and native methods annotations from the native methods annotations repository in order to analyze a library. In one or more embodiments of the invention, the analysis execution engine (106) includes functionality to generate one or more analysis results.

In one or more embodiments of the invention, the analysis execution engine (106) is operatively connected to an analysis results repository (116). In one or more embodiments of the invention, the analysis results repository is a data repository, similar to the data repository described above, in which one or more analysis results obtained by the analysis execution engine (106) are stored.

While FIG. 1 shows a configuration of components, other configurations may be used without departing from the scope of the invention. For example, various components may be combined to create a single component. As another example, the functionality performed by a single component may be performed by two or more components. The invention is not limited by the system shown in FIG. 1.

FIG. 2 shows a flowchart in accordance with one or more embodiments of the invention. While the various steps in the flowchart are presented and described sequentially, one having ordinary skill in the art and having the benefit of this disclosure will appreciate that some or all of the steps may be executed in different orders, may be combined or omitted, and some or all of the steps may be executed in parallel. In one or more embodiments of the invention, the steps shown in FIG. 2 may be performed in parallel with any other steps shown in FIG. 2 without departing from the invention.

FIG. 2 shows a method for performing a static analysis of a library in accordance with one or more embodiments of the invention. In Step 200, native methods used by a library are annotated. In one or more embodiments of the invention, annotations of the native methods are provided by an entity, such as a programmer and may avoid the need to write a static analysis tool for the language in which the native methods are written. Native methods annotations may be expressed as a set of pre-defined annotation types (e.g., Datalog facts expressions) capable of being understood and used be the analysis execution engine. For example, a pre-defined set of possible annotations may include an annotation such as "creationSite(loc, car, type)", where "loc" is a label representing the creation site (e.g., of an object), "var" represents the variables which point to the created object, and "type" represents the type(s) of the created object. As another example, the annotations may include "returnVariable(x)", which indicates that the value "x" may be returned by the method. In one or more embodiments of the invention, native methods annotations are stored in a native methods annotations repository to be provided to the analysis execution engine for analyzing a library.

In Step 202, library facts are extracted from a library. In one or more embodiments of the invention, the extractor module is provided a library on which the extractor module performs a single syntactic traversal over the library source code to produce a set of semantic relations (i.e., library facts). The semantic relationships may be produced by the extractor module to capture the behavior of the library. For example, operations about program variables and types may be produced and stored in relational form. In one or more embodiments of the invention, the library is one taken from a library repository. The library facts produced by the extractor module may be stored in a library facts repository to be provided to the analysis execution engine when analyzing a library. In one or more embodiments of the invention, the library facts are expressed as declarative logic programming language facts.

In Step 204, a type-object lattice is constructed. In one or more embodiments of the invention, the known object-creation sites within the library to be analyzed become nodes in the type-object lattice, as do all potential unknown object creation sites (in relation to the library) from outside the library (i.e., from applications). The known and unknown object-creation sites from the library may be overlaid with types (e.g., classes) that subsume the known and unknown object-creation sites as well as any sub-types (e.g., sub-classes). In one or more embodiments of the invention, some type nodes (e.g., class nodes) of the type-object lattice will not have any unknown object-creation sites, which means that object instantiations from the class cannot exist outside the library and therefore cannot exist in an application using the library.

Figure 2A:
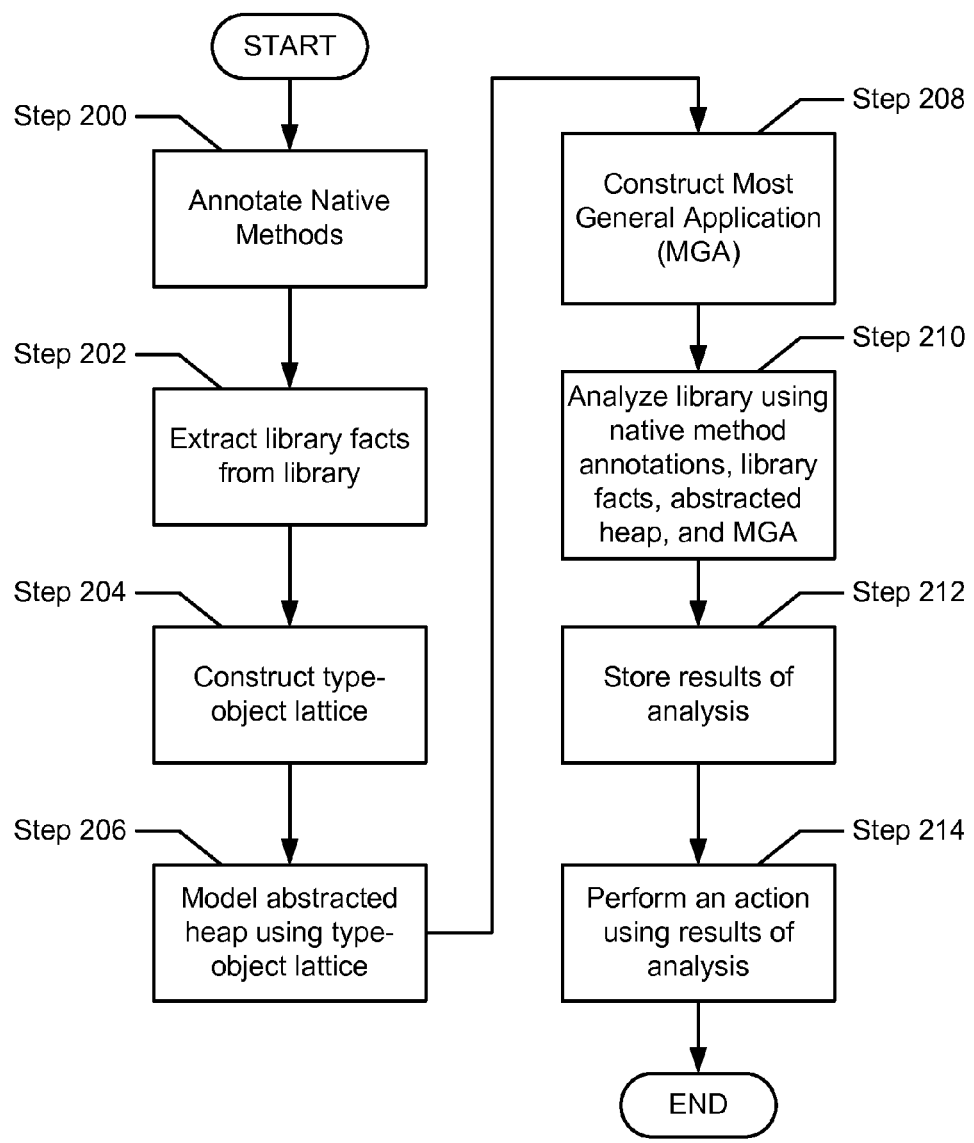
FIG. 2A shows a flowchart in accordance with one or more embodiments of the invention.
Figure 2B:
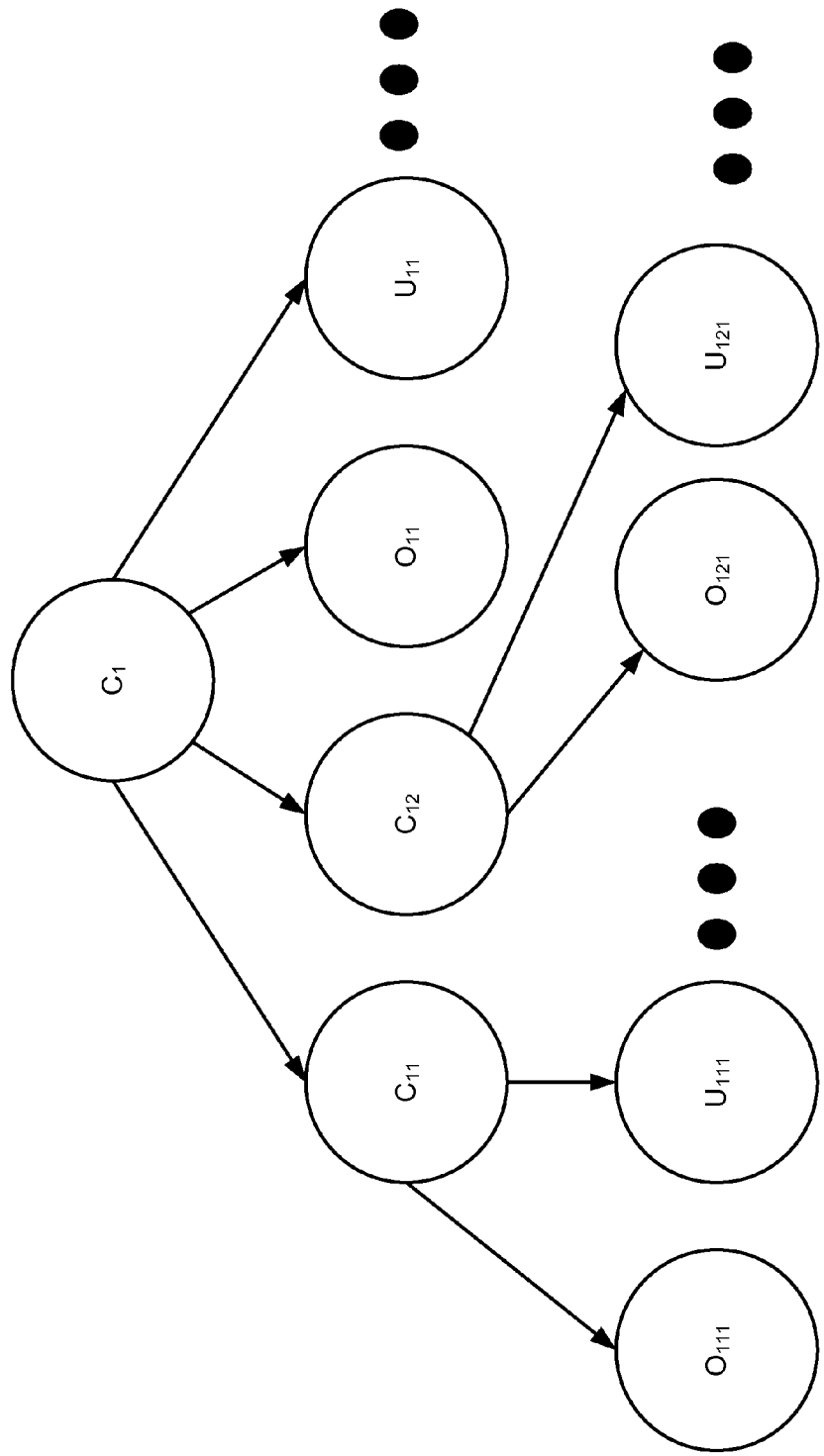
FIG. 2B shows a type-object lattice in accordance with one or more embodiments of the invention.

FIG. 2B shows an Hasse diagram example of a type-object lattice in accordance with one or more embodiments of the invention. The example type-object lattice is for explanatory purposes only and is not intended to limit the scope of the invention. In FIG. 2B, known object creation sites from the library are denoted "O". Unknown object creation sites from applications interacting with the library are denoted "U". Classes (i.e., types) are denoted "C". At the top of the lattice is class $C_1$. Beneath class $C_1$ are two sub-classes $C_{11}$ and $C_{12}$, a known object creation site $O_{11}$, and some number of unknown object creation sites represented by $U_{11}$. Beneath sub-class $C_{11}$ is a known object creation site $O_{111}$, and some number of unknown object creation sites represented by $U_{111}$. Similarly, beneath sub-class $C_{12}$ is a known object creation site $O_{121}$, and some number of unknown object creation sites represented by $U_{121}$. In the present example, each known and unknown object creation site is directly connected to their actual class (i.e., type) and indirectly to classes of which the actual class is a sub-class. For example, object creation site $O_{111}$ is directly connected to class $C_{11}$, and indirectly connected to class $C_1$ of which $C_{11}$ is a sub-class. In this way, the type-object lattice includes the partial order of sub-classing that is defined by the class definition of the library to be analyzed.

Returning to FIG. 2A, in Step 206, the type-object lattice constructed in Step 204 is used to model an abstracted heap. In one or more embodiments of the invention, the elements of the type-object lattice (i.e., known object-creation sites, unknown object-creation sites, and types) are used as the nodes of the abstracted heap. The abstracted heap may be expressed as facts and rules in a declarative logic programming language (e.g., Datalog)

In one or more embodiments of the invention, constructing an abstracted heap includes encoding heap update operations (written in the programming language of the library to be analyzed) in the programming language that will be executed by the analysis execution engine (e.g., Datalog rules). For example, Java® programming language operations (e.g., o: x=new T( )) may be encoded as rules in a declarative programming language such as Datalog, which the analysis execution engine is capable of executing. Performing such an encoding for all relevant programming language operations, or a portion thereof, may provide a set of rules encoded in the declarative programming language which indicate what types and/or object-creation sites a given variable may point to and also which object-creation sites include fields that may point to other object-creation sites. Table 1 (below) includes non-limiting examples of Java® expressions encoded in Datalog as constraints to be used in heap update operations:

TABLE 1

Semantics Using Object-Creation Sites

| Operation | Constraints for Updating Heap |
|---|---|
| o: x = new T( ); | $o \in p(x)$ |
| x = y; | $p(y) \subseteq p(x)$ |

TABLE 1-continued

Semantics Using Object-Creation Sites

| Operation | Constraints for Updating Heap |
|---|---|
| x.f = y; | $\forall o \in p(x): \forall z \sqsubseteq T_f(o): p(y) \subseteq h(z.f)$ |
| x = y.f; | $\forall o \in p(y): \forall z \sqsubseteq T_f(o): h(z.f) \subseteq p(x)$ |

In Step 208, the MGA is constructed. In one or more embodiments of the invention, construction of the MGA includes subjecting class definitions (relevant to a library to be analyzed) to a MGA generation algorithm. Such an algorithm may include an initial step to, for each public class in a selected library, create a node. Next, for each public field defined in each class of a given type, an edge is added. In the event that a given class is actually a sub-class (e.g., class $C_{12}$ from FIG. 2B) that does not redefine a field from a parent class, another edge is added. In one or more embodiments of the invention, while the algorithm for generating a MGA remains the same regardless of the library to be analyzed, the MGA constructed will be different for each different library.

Figure 2C:
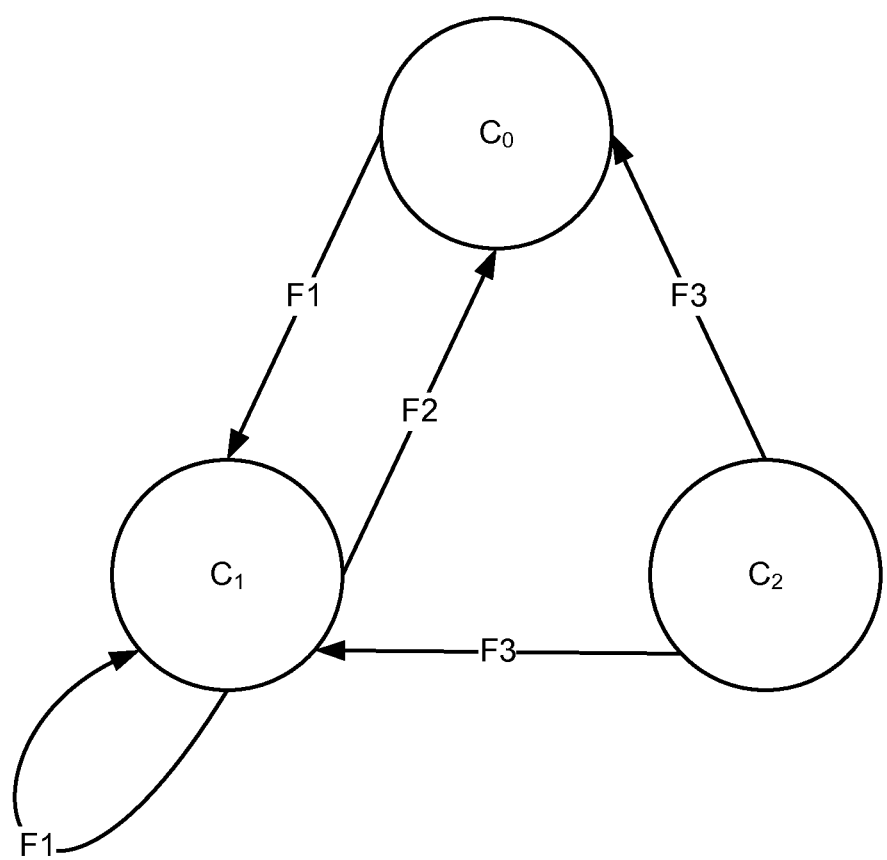
FIG. 2C shows a most general application in accordance with one or more embodiments of the invention.

FIG. 2C shows an example of a MGA constructed using the algorithm described above in accordance with one or more embodiments of the invention. The example MGA is for explanatory purposes only and is not intended to limit the scope of the invention. In the present example, three classes are defined from which an application using the library is unable to extend subclasses. A class $C_0$ defines a public field F1 of type $C_1$. Any private fields in a class are not accessible by an application and may not be represented in a MGA. Because F1 is a public field of type $C_1$, the MGA construction assumes that in F1, any known or unknown objects of type $C_1$ or a sub-class/type may be stored. Therefore, in the MGA, an edge is added from class $C_0$ to class $C_1$ labeled F1. A second class $C_1$ extends class $C_0$ and thus inherits field F1 from class $C_0$. To represent this in the MGA, an edge is added for F1 from class C1 to itself because F1 is of type $C_1$. Class $C_1$ further defines a public field F2 of type $C_0$. Therefore, in the MGA an edge is added from class $C_1$ to class $C_0$ for F2. A third class $C_2$ defines a public field F3 of type $C_0$. Because class $C_1$ is a sub-class of $C_0$, two edges are added to the MGA for F3. Specifically, one edge is added from $C_2$ to $C_0$ and the other edge is added from $C_2$ to $C_1$. With all three classes and accompanying public fields represented, the MGA for the three class library of the present example is complete.

Returning to Step 208 of FIG. 2A, once the MGA has been modeled as described above in the description of FIG. 2C, construction of the MGA is completed by expressing the MGA as rules and/or facts in a declarative logic programming language for execution by the analysis execution engine.

Returning to FIG. 2A, in Step 210, the library analysis (including abstracted heap and MGA), native methods annotations, and library facts are used by the analysis execution engine to statically analyze the library. In one or more embodiments of the invention, the analysis execution engine performs the analysis by executing declarative programming language facts and rules in which the abstracted heap of the library, heap update operations, the MGA, the library facts, and the native methods annotations have been expressed. The analysis performed by the analysis execution engine may include execution of the interaction between the abstracted heap and of the MGA. For example, consider the program fragment:

```
public void method(T v) {
    x.f = v;
}
```

In the program fragment described above, both x and f are defined somewhere in the library that is to be analyzed. The variable v initially points to the element corresponding to T in the MGA because it comes from the unknown application. The abstracted heap will include objects to which the variable x may point. The store operation into the heap (e.g., a heap update rule encoded as a Datalog rule) may result in an update to the abstracted heap such that the field f of the object that x points to will now point to the element corresponding to T in the MGA.

In one or more embodiments of the invention, the analysis execution engine execution is designed to determine if any security vulnerabilities exist in the library. For example, the analysis performed by the analysis execution engine may determine if the library can be triggered (e.g., by an application) to reach an unsafe state or to perform unsafe actions. In one or more embodiments of the invention, coding guidelines exist for a given programming language in which a library is written that inform application and/or library developers of techniques to employ when writing source code to avoid security vulnerabilities. For example, a set of guidelines for the Java® programming language may include a section on how to safely invoke standard application programming interfaces that perform tasks using the immediate caller's class loader instance. A variety of methods (e.g., java.lang.System-.LoadLibrary) may be indicated that vary behavior according to an immediate caller's class and are thus considered caller-sensitive. The guidelines may include a rules such as the following: (i) that a method should not be invoked on behalf of untrusted code, because the untrusted code may not have the ability to load the library in question using its own class loader instance; (ii) that a method should not invoke a method using inputs provided by untrusted code; and (iii) do not propagate objects that are returned by the method back to the untrusted code. In one or more embodiments of the invention, the analysis execution engine's execution determines if any rules such as those in the preceding example have been violated, leaving the library susceptible to one or more security vulnerabilities that the security guideline rules for the programming language are designed to prevent.

In Step 212, the results obtained by the analysis performed in Step 210 are stored in the analysis results repository. In one or more embodiments of the invention, the results obtained by the analysis execution engine as a result of the analysis performed using the MGA, the library facts, and the native method annotations include violations, or a lack thereof, of programming language guidelines that render the library vulnerable. The results including such information about potential security vulnerabilities of the library are stored in the analysis results repository. In the event a security vulnerability is discovered, a result record may be created that includes information capable of informing an entity of various data related to the potential security vulnerability. For example, the results may include information regarding which security guideline has been violated, potential security vulnerabilities related to the violated guideline, and where in the library source code the basis of the security vulnerability exists.

In Step 214, an action is performed using one or more analysis results stored in the analysis results repository. In one or more embodiments of the invention, the action may be to generate, using the results obtained by the analysis execution engine in Step 210 and stored in the analysis results repository in Step 212, a report that summarizes all potential security violations discovered, discovered security guideline breaches that may lead to the security vulnerabilities, and the locations in library source code in which the security guideline violations may be found. In one or more embodiments of the invention, the result may be stored as a document capable of being accessed by an interested entity. In other embodiments of the invention, the results may be displayed in some fashion (e.g., in a graphical user interface) that a user of the invention is able to view.

In one or more embodiments of the invention, the above-described method may be used to statically analyze all aspects of a programming language, or a portion thereof. For example, method declarations and invocations may be statically analyzed. Any public method in a library can be invoked by an application. Therefore, for the purposes of the static analysis, each parameter of the public methods in a library will point to its appropriate type in the MGA as a part of the initial points to relationships. Based on the points to relation of the virtual dispatch of method calls may be deduced by the types and the object-creation sites in the points to relation of the object for which the method is invoked. For known object-creation sites, the type is known and a virtual dispatch table will give the method that will be invoked. For types, there may be more than one possible method that may be invoked because the creation sites may be from a sub-type.

Figure 3:
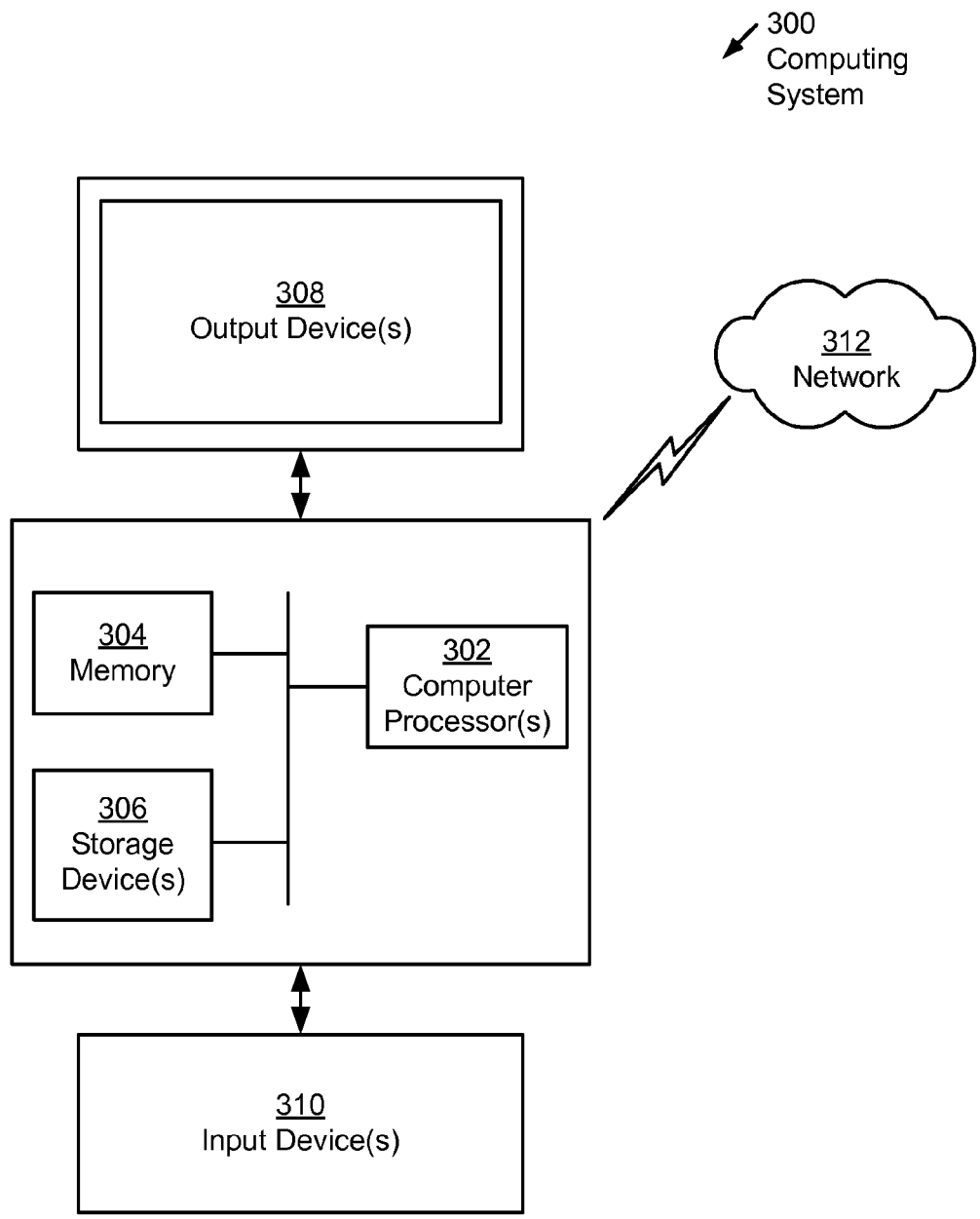
FIG. 3 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a blade-server chassis, or any other type of computing device or devices that includes at least the minimum processing power, memory, and input and output device(s) to perform one or more embodiments of the invention. For example, as shown in FIG. 3, the computing system (300) may include one or more computer processor(s) (302), associated memory (304) (e.g., random access memory (RAM), cache memory, flash memory, etc.), one or more storage device(s) (306) (e.g., a hard disk, an optical drive such as a compact disk (CD) drive or digital versatile disk (DVD) drive, a flash memory stick, etc.), and numerous other elements and functionalities. The computer processor(s) (302) may be an integrated circuit for processing instructions. For example, the computer processor(s) may be one or more cores, or micro-cores of a processor. The computing system (300) may also include one or more input device(s) (310), such as a touchscreen, keyboard, mouse, microphone, touchpad, electronic pen, or any other type of input device. Further, the computing system (300) may include one or more output device(s) (308), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (300) may be connected to a network (312) (e.g., a local area network (LAN), a wide area network (WAN) such as the Internet, mobile network, or any other type of network) via a network interface connection (not shown). The input and output device(s) may be locally or remotely (e.g., via the network (312)) connected to the computer processor(s) (302), memory (304), and storage device(s) (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (300) may be located at a remote location and connected to the other elements over a network (312). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or microcore of a computer processor with shared memory and/or resources.

Static analysis of libraries in the state of the art prior to this disclosure generally assume that all, or at least a portion, of the source code of an application using the library is available. With source code of an application and the source code of a library to be analyzed, an analysis of the library as used by that specific application may be achieved. Such analysis is limited to only providing information about how the specific applications interacts with the library and provides no information about how other applications may interact with the library. In contrast, one or more embodiments of the invention described herein do not require any source code of the application and further condense the behavior of all possible applications interacting with the library into a single generated application that is used to analyze the library. Said another way, embodiments of the invention generate a specifically designed application for the express purpose of analyzing all or substantially all points of interaction between the target library and any application that may interact with the library. Such an analysis may provide information related to security vulnerabilities that a library may experience when interacting with any application rather than just a single application.

While embodiments of the invention have been described with respect to Datalog, the invention is not limited to Datalog; rather, embodiments of the invention may be implemented using any other declarative logic programming language.

While the invention has been described with respect to a limited number of embodiments, those skilled in the art and having benefit of this disclosure will appreciate that other embodiments can be devised which do not depart from the scope of the invention as disclosed herein. Accordingly, the scope of the invention should be limited only by the attached claims.

What is claimed is:

1. A method for statically analyzing a library comprising:
obtaining native method annotations associated with native methods invoked by the library;
extracting facts from the library to obtain library facts, wherein the library is written in a first programming language;
constructing a type-object lattice;
modeling an abstracted heap using the type-object lattice, wherein modeling the abstracted heap comprises expressing the abstracted heap as rules and facts of a declarative logic programming language;
expressing abstracted heap update operations as heap update rules;
constructing, based on the library, a most general application (MGA) for the library;
analyzing the library using the native method annotations, the library facts, the MGA, the abstracted heap, and the heap update rules to obtain results;
storing the results of the analysis, wherein the results comprise a source code location in the library at which a security vulnerability exists; and
performing an action based on the results,
wherein the action comprises generating a report comprising the source code location of the security vulnerability, and
wherein the report is accessible by an interested entity.

2. The method of claim 1, wherein the native methods annotations comprise information related to the native methods and wherein the native methods are written in a second programming language.

3. The method of claim 1, wherein the results of the analysis further comprise security guideline breach information and security vulnerability information.

4. The method of claim 1, wherein constructing the MGA comprises:
creating a node for each public class in the library; and
adding a set of edges corresponding to a set of public fields of a set of public classes of the same type.

5. The method of claim 1, wherein constructing the MGA comprises semantically condensing behavior of a plurality of applications into a single application representation.

6. The method of claim 1, wherein the library facts comprise a set of semantic relations, and wherein extracting the library facts comprises syntactically traversing source code of the library.

7. The method of claim 1, wherein analyzing the library comprises executing a declarative programming logic programming code.

8. A system for statically analyzing a library; comprising:
memory;
a processor comprising circuitry and operatively connected to the memory;
a native methods annotation repository configured to store native methods annotations;
a library repository configured to store a library;
an extractor module executing on the processor and configured to extract library facts from a library;
a library facts repository configured to store the library facts;
a library analysis module executing on the processor and configured to express information related to the library as facts and rules in a declarative logic programming language and comprising:
a type-object lattice;
an abstracted heap comprising heap update rules; and
a most general application (MGA);
an analysis execution engine executing on the processor and configured to analyze the library based on the native method annotations, the library facts, the MGA, the abstracted heap, and the heap update rules to obtain results; and an analysis results repository configured to store the results,
  wherein the results comprise a source code location in the library at which a security vulnerability exists,
  wherein an action is performed based on the results, and
  wherein the action comprises generating a report comprising the source code location of the security vulnerability, and wherein the report is accessible by an interested entity.

9. The system of claim 8, wherein the native methods annotations comprise information related to the native methods and wherein the native methods are written in a second programming language.

10. The system of claim 8, wherein the abstracted heap is modeled using the type-object lattice and wherein updating the abstract heap comprises using a set of primitive operations.

11. The system of claim 8, wherein the results of the analysis further comprise security guideline breach information and security vulnerability information.

12. The system of claim 8, wherein the library analysis module is configured to construct the MGA, and wherein constructing the MGA comprises:
  creating a node for each public class in the library; and
  adding a set of edges corresponding to a set of public fields of a set of public classes of the same type.

13. The system of claim 8, wherein the library analysis module is further configured to construct the MGA by semantically condensing behavior of a plurality of applications into a single application representation.

14. The system of claim 8, wherein the library facts comprise a set of semantic relations, and wherein the extractor module is configured to syntactically traverse source code of the library to obtain the library facts.

15. The system of claim 8, wherein the analysis execution engine is a Datalog execution engine and wherein the analysis execution engine is further configured to analyze the library by executing Datalog programming code.

16. A non-transitory computer readable medium comprising instructions which, when executed by a computer, cause a computer processor to:
  obtain native method annotations associated with native methods invoked by the library;
  extract facts from the library to obtain library facts, wherein the library is written in a first programming language;
  construct a type-object lattice;
  model an abstracted heap using the type-object lattice, wherein modeling the abstracted heap comprises expressing the abstracted heap as rules and facts of a declarative logic programming language;
  express abstracted heap update operations as heap update rules;
  construct, based on the library, a most general application (MGA) for the library;
  analyze the library using the native method annotations, the library facts, the MGA, the abstracted heap, and the heap update rules to obtain results;
  store the results of the analysis, wherein the results comprise a source code location in the library at which a security vulnerability exists; and
  perform an action based on the results,
    wherein the action comprises generating a report comprising the source code location of the security vulnerability, and
    wherein the report is accessible to an interested entity.

17. The non-transitory computer readable medium of claim 16, wherein the native methods annotations comprise information related to the native methods and wherein the native methods are written in a second programming language.

18. The non-transitory computer readable medium of claim 16, wherein the results of the analysis further comprise security guideline breach information and security vulnerability information.

* * * * *